United States Patent

[11] 3,601,541

[72] Inventor Joseph Thompson
Glanworth, Ontario, Canada

[21] Appl. No. 884,481
[22] Filed Dec. 12, 1969
[45] Patented Aug. 24, 1971
[73] Assignee Northern Electric Company Limited
Montreal, Quebec, Canada

[54] TELEPHONE PAYSTATION PROVIDING FREE SERVICE TO SPECIAL NUMBERS

4 Claims, 1 Drawing Fig.

[52] U.S. Cl. .................... 179/6.3
[51] Int. Cl. .................... H04m17/02
[50] Field of Search .................... 179/6.3, 18 DA

[56] References Cited

UNITED STATES PATENTS

| | | | |
|---|---|---|---|
| 2,137,409 | 11/1938 | Martin et al. | 179/6.3 |
| 2,707,724 | 5/1955 | Gallagher | 179/6.3 |
| 2,791,634 | 5/1957 | Lomax | 179/6.3 |

*Primary Examiner*—Kathleen H. Claffy
*Assistant Examiner*—Jan S. Black
*Attorney*—Curphey & Erickson

ABSTRACT: A telephone paystation which permits calling to one or more preselected numbers without deposition of a coin. No attempt is made to restrict the dialling of any number. However, the action of dialling causes the telephone's transmit and receive circuit to be at least partly disabled. Enabling of the circuit is accomplished by deposition of a coin or by transmission of a control signal from the central office which is sent in response to the dialling of the preselected numbers.

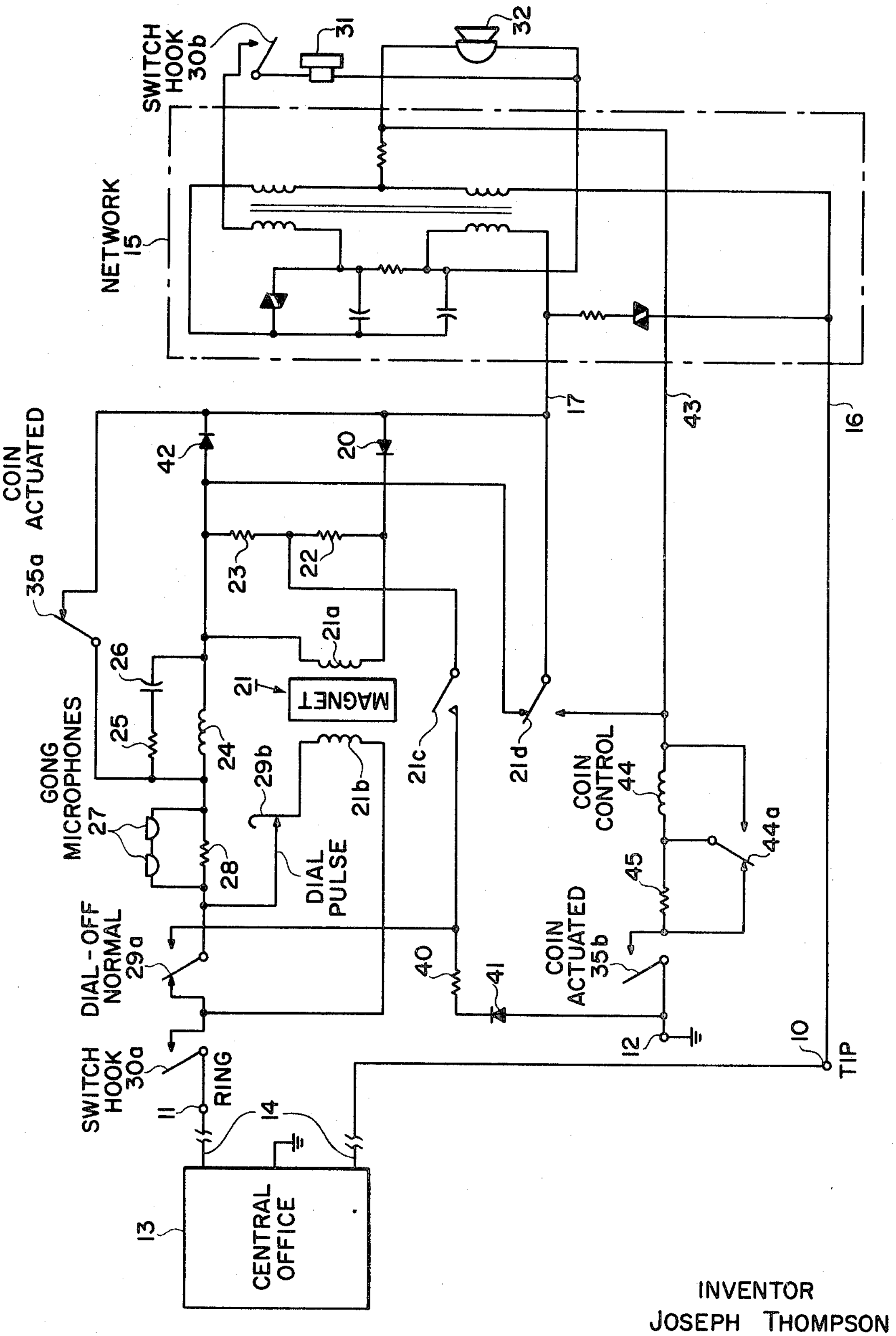
INVENTOR
JOSEPH THOMPSON
BY Curphey & Erickson
PATENT AGENTS

TELEPHONE PAYSTATION PROVIDING FREE SERVICE TO SPECIAL NUMBERS

FIELD OF THE INVENTION

This invention relates to a telephone pay station and in particular to one having prepay-type operation which permits calls to certain specified numbers without depositing a coin.

DESCRIPTION OF THE PRIOR ART

Recently, considerable interest has been shown by telephone operating companies to provide "free emergency calling" at all pay stations. In the past, several such systems have been proposed; however very few have ever been adopted. One such system utilizes a modified rotary or push-button dial which excludes any number other that "0" from being dialed until a coin is deposited. In an alternate system, the central office recognizes whether or not a coin deposit has been made at the pay station (which is determined by the presence of a "ground"). If no deposit is made, then only "0" is recognized. These systems are susceptible to fraudulent practices and are limited since only "0" can be dialed.

In still other systems dialling is permitted up to a certain number of digits (for instance 3 digits) without deposition of a coin. This permits free calling of the operator or any 3 digit number. In general, these systems require extensive modifications to the central office. With a large variety of central office equipment in use, such systems often become impractical.

SUMMARY OF THE INVENTION

The present invention differs from previous systems in that no attempt is made to restrict the dialling of the number. If money is deposited, the call can be completed and two-way transmission established between the two parties. If money is not deposited, the action of dialling at least partially disables the transmission circuit which will remain so unless a coin is deposited if the call is to a charge number, or unless a control pulse is sent by the central office which restores the transmission circuit. This pulse may be the same pulse which is used to refund money such as is commonly used when the operator answers.

Thus, in accordance with the present invention there is provided a pay station for a telephone system having a central office which includes means for transmitting a control signal in response to the dialling of at least one preselected number at the station upon answering of the called number. The station comprises a dial, a switch hook, and a transmit and receive circuit which is connected to a telephone line of the telephone system upon actuation of the switch hook. In addition, there are means responsive to the actuation of the dial for at least partially disabling the transmit and receive circuit. Also, means responsive to the insertion of a coin, or to the transmission of the control signal, for enabling the transmit and receive circuit. Additional means may also be included which is responsive to the same control signal for returning the coin.

The present invention is adaptable to both rotary and push-button dialling and may be implemented for free emergency calling to an operator utilizing existing central office equipment. It may be readily extended to one or more additional members by modifications to the central office which result in a control signal being transmitted therefrom wherever the preselected numbers are dialed.

BRIEF DESCRIPTION OF THE DRAWING

An example embodiment of the invention will now be described with reference to the accompanying drawing which illustrates a schematic circuit diagram of a pay station telephone connected to a central office.

DESCRIPTION OF THE PREFERRED EMBODIMENT

Referring to the single FIGURES, the pay station telephone comprises tip 10, ring 11, and ground 12 connections connected to a central office 13 by a telephone line 14. In addition, a signal path between the tip 10 and the ring 11 is effected by a conventional telephone network 15 having one input connected to the tip 10 by a lead 16. Another lead 17 connects a second input to the network 15 to a diode 20, thence a reset relay coil **21*a* which is in shunt with two serially connected resistors 22 and 23, an electromagnet 24 which is in shunt with a series connected resistor 25 and a capacitor 26, gong signal microphones 27 which are in shunt with an amplitude limiting resistor 28, the break contacts of dial-off-normal transfer contacts 29*a*, and make switch-hook contacts 30*a* to the ring 11. An output of the network 15 is connected to a receiver 31 in series with make switch-hook contacts 30*b*, while a second output is connected to a carbon transmitter 32. The network 15 in conjunction with the receiver 31 and the transmitter 32 comprise a transmit and receive circuit. A pair of break-coin actuated contacts 35*a* which open when a coin is inserted, are connected between the lead 17 and the junction of the electromagnet 24 and the gong signal microphones 28**.

The reset relay coil **21*a* forms part of a magnetic-latching relay, generally 21, which also includes a set relay coil 21*b* that is connected in series with a set of dial pulse contacts 29*b* across the break contacts of the transfer contacts 29*a*. Connected from the make contacts of the transfer contacts 29*a* to the ground 12, is a current limiting resistor 40 in series with a diode 41. Also, a diode 42 is connected between the lead 17 and the electromagnet 24 to permit current to flow in the opposite direction through the signal path such as during an incoming call to the pay station where the current from the central office 13 causes the ring 11 to be positive with respect to the tip 10. During this period the diode 20 blocks the flow of current so that the reset relay coil 21*a* cannot actuate the magnetic latching relay 21**.

The ground connection 12 is connected to the network 15 by a lead 43 in series with a magnetically polarized coin control relay coil 44, a resistor 45 and a pair of make coin actuated contacts **35*b*. A set of transfer contacts 44*a* is connected in shunt with the coil 44 and the resistor 45**, with the transfer contact being connected to the junction thereof.

The present invention permits free emergency calling to an operator by utilizing the existing control signals of the central office 13 and without modifications thereto. However, the system could be extended to one or more additional numbers with modifications to the central office 13 which would transmit a 110 volt DC control signal between the tip 10 and ground 12 whenever the preselected numbers are dialed.

Associated with the magnetic latching relay 21 are a pair of make contacts **21*c* which are connected between the junction of the resistors 22 and 23 and the make contacts of transfer contacts 29*a*. In addition, a pair of transfer contacts 21*d*, also associated with the magnetic latching relay 21, are connected so that the make contacts are connected between the leads 17 and 43 while the break contacts are connected between the lead 17 and the anode of the diode 42**.

The following operating description of the circuit assumes a "loop start" line circuit as opposed to a "ground start" line circuit. In a "loop start" system, the action of going off hook operates the line circuit in the central office providing a dial tone, at which time a ground may be applied and the central office is immediately available to receive dial pulses. In a "-ground start" system dial tone is not received until a coin is deposited.

Additionally, the normal line operating current at the tip 10 is positive and at the ring 11 negative when a call is being sent from the pay station, whereas the control signals from the ground 12 may be either positive or negative relative to the tip 10 or the ring 11 depending upon their operating function. During transmission of the control signals, the tip 10 and the ring 11 are shunted together at the central office 13 so that the control signals are applied between ground 12, and the common tip 10 and ring 11. The line-operating current is, therefore, removed during this interval. The various methods of generating and transmitting the control signals and the operating current from the central office 13 are widely used and well known to those skilled in the telephone art.

During operation, removal of the switch hook (not shown) closes the contacts 30a and 30b and an operating current from the central office 13 flows from the tip 10 through lead 16, the network 15, and lead 17, the coin-actuated contacts 35a, the gong signal microphones 27 and the resistor 28, the break contacts of the transfer contacts 29, the switch hook contacts 30a to the ring 11 and back to the central office 13.

Winding of the dial (not shown) causes the contacts 29a to transfer so that a first control path is established between ground 12, diode 41 through the resistor 40, the make contacts of the transfer contacts 29a, the dial pulse contacts 29b, the set relay coil 21b, the switch hook contacts 30a and the ring 11 back to the central office 13. The current between the ground 12 and the ring 11 is limited by the resistor 40 so that the path does not appear as a false ground to the central office 13.

At the same time, an auxiliary first control path is established between the tip 10 and the ring 11 via the lead 16, the network 15, the lead 17, the coin actuated contacts 35a, the gong signal microphones 27 and the resistor 28, the make contacts of the transfer contacts 29a, the dial pulse contacts 29b, the set relay coil 21b and the switch hook contacts 30a to the ring 11. The combined currents from the two control paths through the set relay coil 21b causes the relay 21 to actuate so that the contacts 21c close and the contacts 21d transfer. Transfer of the contacts 21d removes a shunt across the reset relay coil 21a and places a shunt across the network 15. This latter shunt still permits reduced reception since a portion of the network 15 is retained in the circuit.

However, the operating current from the central office 13 now effectively bypasses the carbon transmitter 32 and as a result, there is no signal output from it.

Due to the closure of the make contacts 21c, a second control path is established between the ground 12 and the ring 11 via the diode 41, the resistor 40, the contacts 21c, the resistor 23 or the resistor 22 in series with the reset relay coil 21a, the electromagnet 24 or the diode 42 in series with the coin trigger contacts 35a, the gong signal microphones 27, the break contacts of the transfer contacts 29a, and the switch hook contacts 30a. This second control path ensures a "coin present" condition after the dial has returned to normal. This is important in central office systems utilizing crossbar which check for such a condition after dialling.

In a typical system, the total resistance in this path should insure a minimum current of approximately 0.016 amps otherwise the central office 13 will not recognize the path as being valid. However, since the reset relay coil 21a must operate with a maximum current of approximately 0.018 amps, the resistor 23 shunts the coil 21a to ensure that the relay 21 will not reset under these conditions.

If the call has been made to an operator, the central office 13 will transmit a 110 volt DC refund pulse (in a well known manner) between the ground 12 (positive) and the ring 11 (negative) upon answering, which will pass through the second control path described previously. This will cause an increased current to flow which will energize the reset relay coil 21, causing the contacts 21c and 21d to rest thus opening the ground circuit and restoring normal transmission.

If the call is to a charged number, the transmission path described previously stays disabled after the called party answers assuming no coin deposit has been made prior to this time. The deposition of a coin will open and close the coin trigger contacts 35a and 35b respectively. Opening of the contacts 35a will cause the line current to flow from the tip 10 to the ring 11 via the lead 16, the network 15, lead 17, the diode 20, the reset relay coil 21a or the resistors 22 and 23, the electromagnet 24, the microphones 27 and resistor 28, the break contacts of the transfer contacts 29a, and the switch hook 30a. The resistors 22 and 23 are selected so that the reset relay coil 21a now receives 0.018 amps minimum. As a result, the magnetic latching relay 21a resets so that the transmission circuit is restored to normal. It can readily be seen that a coin deposit during any stage of the call will cause the magnetic latching relay 21a to reset and thus provide normal transmission.

The electromagnet 24 performs a totalizing function so as to ensure a minimum deposit of 10¢ for a local call. Initially, it is shunted by the coin actuated contacts 35a and when deenergized, permits a single nickel deposit to pass into a trap (not shown). A second nickel deposit releases the trap and both coins pass into a hopper (not shown) so as to open and close the contacts 35a and 35b respectively. The electromagnet 24 now energizes and in so doing causes the trap to open, thus permitting single nickel deposits to pass into the hopper as required on toll calls. The construction and operation of this feature are well known to those skilled in the telephone art.

With the contacts 35b closed, the magnetically polarized coin control relay 44 is actuated by 110 volt DC control signals from the central office 13 which are applied between the tip 10 and the ground 12. A refund signal of 110 volts DC with positive ground and negative tip causes the magnetically polarized relay 44 to actuate and deflect the coin into a return chute (not shown) of the pay station. Additionally, a collect signal of 110 volts DC with negative on ground 12 and positive on the tip 10 cause the magnetically polarized relay 44 to actuate in the other direction and directs the coin to a coin collector box (not shown) of the pay station. The transfer contacts 44a of the magnetically polarized relay 44, ensure a predetermined cyclic operation of the coil 44, by first short circuiting the coil 44 and thereafter providing a slow release of the contacts in a well-known manner. The function of the resistor 45 is to simulate the DC impedance of the coil 44 when the latter is short circuited. Also, as the relay 44 deenergizes due to the short circuit caused by the transfer of the contacts 44a, it resets the coin-actuated contacts 35a and 35b to their nonactuated positions. As a result, the electromagnet 24 is deenergized by the closing of the contacts 35a. At the same time, the relay 44 is prevented from reenergizing by the opening of the contacts 35b.

What is claimed is:

1. A pay station for a telephone system having a central office including means for transmitting a control signal in response to the dialling of at least one preselected number at the pay station; the pay station comprising:

a dial;

a signal path including a switch hook and a transmit and receive circuit, the transmit and receive circuit being connected to a telephone line of the telephone system upon actuation of the switch hook;

means responsive to the actuation of the dial for at least partially disabling the transmit and receive circuit;

means responsive to the insertion of a coin and the like for enabling the transmit and receive circuit; and means responsive to the transmission of said control signal for enabling the transmit and receive circuit.

2. A pay station as defined in claim 1 additionally including means responsive to the transmission of said control signal for returning the coin and the like.

3. A pay station, for a telephone system having a central office connected to the pay station by a telephone line, said central office having a control circuit for transmitting a control signal to the pay station in response to the dialling of at least one preselected number at said station;

said pay station comprising:

a transmit and receive circuit;

a first control path including a switch hook, dialing means, set relay means for at least partially disabling the transmit and receive circuit and for engaging reset relay means upon actuation thereof, and first contact means responsive to actuation of the dialing means for connecting the first control path to the control circuit of the central office so as to actuate said set relay means by an operating current from the central office;

a second control path including the switch hook and the reset relay means for enabling the transmit and receive circuit and for disengaging itself upon actuation thereof; and second contact means responsive to the unactuated dialing means for connecting said second control path to the control circuit of the central office so as to actuate the reset relay means by the control signal; and a signal path connected to the telephone line and including the switch hook, the second contact means, the transmit and receive circuit, the reset relay means, and coin-actuated means for enabling the reset relay means so that the operating current from the telephone line will actuate the reset relay means and thereby enable the transmit and receive circuit.

4. A pay station as defined in claim 3 which additionally comprises:

a third control path including further coin-actuated means for enabling the third control path, and means responsive to said control signal for ejecting said coins from the pay station.